United States Patent
Kaneko et al.

(10) Patent No.: US 6,178,899 B1
(45) Date of Patent: Jan. 30, 2001

(54) WASTE TREATMENT METHOD AND WASTE TREATMENT APPARATUS

(75) Inventors: Masaki Kaneko, Ayase; Masashi Yoshimori, Yokosuka, both of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/287,659

(22) Filed: Apr. 7, 1999

(30) Foreign Application Priority Data

Apr. 7, 1998 (JP) .................................................. 10-094995

(51) Int. Cl.[7] ................................ F23G 5/02; F23G 7/00; F23B 5/02; B09B 3/00; F23J 15/00
(52) U.S. Cl. ........................ 110/346; 110/204; 110/219; 110/235; 110/342; 110/345; 110/346; 110/233; 60/643
(58) Field of Search ..................................... 110/203, 204, 110/218, 219, 220, 223, 235, 255, 293, 327, 341, 342, 345, 346, 233; 60/643; 422/168, 169, 170, 172

(56) References Cited

U.S. PATENT DOCUMENTS

| | | | |
|---|---|---|---|
| 4,063,903 | * 12/1977 | Beningson et al. | .......................... 44/2 |
| 4,089,277 | * 5/1978 | Paul | ...................... 110/204 |
| 4,303,477 | * 12/1981 | Schmidt et al. | ........................ 201/2.5 |
| 4,599,953 | * 7/1986 | Gould | .................... 110/234 |
| 4,865,625 | * 9/1989 | Mudge et al. | ..................... 48/197 R |
| 4,878,440 | * 11/1989 | Tratz et al. | ............................ 110/223 |
| 5,170,725 | 12/1992 | Sass et al. . | |
| 5,190,672 | * 3/1993 | Coenen et al. | ......................... 210/770 |
| 5,411,714 | * 5/1995 | Wu et al. | ............................... 422/232 |
| 5,536,896 | * 7/1996 | Hesbol et al. | ........................... 588/19 |
| 5,581,128 | * 12/1996 | Royle | .................... 290/4 D |
| 5,592,888 | * 1/1997 | Berwein et al. | ...................... 110/229 |
| 5,711,235 | * 1/1998 | May et al. | ............................ 110/257 |

\* cited by examiner

*Primary Examiner*—Denise L. Ferensic
*Assistant Examiner*—K. B Rinehart
(74) *Attorney, Agent, or Firm*—Oblon, Spivak, McClelland, Maier & Neustadt, P.C.

(57) ABSTRACT

An industrial waste and household waste is treated by a pyrolysis step for carbonizing waste containing organic substance in a condition sealed from an air so as to separate to a pyrolysis gas and a pyrolysis residue; a gas cracking step for introducing the pyrolysis gas after the pyrolysis step so as to react an oxide component in the pyrolysis gas through an oxidization reaction and thermally decompose high molecular hydrocarbon in the pyrolysis gas with a heat generated by the oxidization reaction so as to obtain a cracked gas containing low molecular hydrocarbon; a residue cooling step for cooling the pyrolysis residue generated in the pyrolysis step for solidification; a mechanical processing step for crushing and sorting the pyrolysis residue solidified in the residue cooling step so as to obtain a pyrolysis char essentially consisting of pyrolysed organic substance and inorganic components; and a smelting and gasifying step for burning the pyrolysis char obtained in the mechanical processing step at a high temperature by being mixed with fuel and oxygen or air so as to melt the inorganic component of the pyrolysis char and gasify the carbon component to obtain a gasified gas containing low molecular hydrocarbon.

19 Claims, 5 Drawing Sheets

WASTE TREATMENT METHOD AND WASTE TREATMENT APPARATUS

BACKGROUND OF THE INVENTION

The present invention relates to waste treatment method and waste treatment apparatus capable of effectively obtaining an energy from an industrial waste and municipal or domestic waste particularly by utilizing a technology for improving gasification treatment function and efficiency.

Waste is largely classified into municipal or domestic waste including household waste, so-called urban waste, and industrial waste.

These wastes include various sectors of materials such as paper, fiber, wood, bamboo, rubber, metal, plastic, glass, pottery, soil, sand and the like. A calorific value (heating value) of these wastes is generally calculated to be 4000–5000 kcal on dry basis excluding water content, which corresponds to about $2/3$ of the heating value of coal. Therefore, it is considered that the waste is a large energy source.

Recently, various waste treatment (disposal) methods for obtaining energy from the waste have been developed.

For example, Japanese Patent Laid-Open Publication No. HEI 8-24904 and Japanese Patent Laid-Open Publication No.HEI 9-79548 disclose a waste treatment (disposal) method and waste treatment apparatus relating to the waste treatment method.

FIG. 6 is a diagram showing a structure of a conventional waste treatment apparatus.

As shown in FIG. 6, the waste treatment apparatus essentially comprises a pyrolysis (thermal decomposition) unit 4 for pyrolysing waste 1 as raw material into pyrolysis gas 2 and solid material 3, and a mechanical processing unit 5 for crushing the solid material 3 obtained by this pyrolysis unit 4 to fine particles so as to separate metal contained in the solid material 3, which are processing units on an initial stage. Further, a high temperature gasification unit 10 for converting a pyrolysis char 6 obtained by the mechanical processing unit 5 and pyrolysis gas 2 obtained by the pyrolysis unit 4 to heating gas 9 of low molecular carbide by adding oxidizer 7 and production control char 8 like coke is provided at the post stage.

The pyrolysis unit 4 is provided with a shredder 11 for crushing the waste 1 to fine particles and on the other hand, a secondary side of the high temperature gasification unit 10 is provided with a gas scrubber 12 for removing HCl, HF and dirt. Then, an energy utilization unit 13 for supplying the heating gas 9 and a flue gas desulfurization plant 15 for desulfurizing flue gas 14 are provided on the secondary side of the gas scrubber 12.

A waste treatment method for treating the waste using the apparatus of the structure mentioned above will be described hereunder.

That is, after the waste 1 essentially consisting of metallic dirt to which organic substance adheres is crushed to fine particles with the shredder 11, air 16 and energy 17 are supplied to the pyrolysis unit 4, which is actuated at a temperature of about 550–600° C. so as to separate the pyrolysis gas 2 and solid material 3. This solid material 3 is crushed by the mechanical processing unit 5, and metal 18 contained in the solid material 3 is sorted and the metal 18 is removed after washing. On the other hand, after the metal 18 is removed, the pyrolysis char 6 essentially consisting of pyrolysed organic substance and inorganic component is introduced to a high temperature gasification unit 10 together with the pyrolysis gas 2.

The high temperature gasification unit 10 is operated by supplying an oxidizer 7 and an energy 19 at 1600° C. so as to convert the pyrolysis char 6 and pyrolysis gas 2 to a low molecular heating gas 9. In this high temperature gasification unit 10, the inorganic component is converted to part of glass structure 20 through a heating process, and the inorganic component is then removed.

After dirt contained in the heating gas 9 is removed in the gas scrubber 12, the heating gas 9 is introduced to the energy utilization 13. Further, the flue gas 14 generated from the energy utilization unit 13 and exhaust gas 21 generated from the pyrolysis unit 4 are introduced into the flue gas desulfurization plant 15 so as to obtain a low temperature clean exhaust gas 22.

A part of gas 23 purified by removing dirt in the gas scrubber 12 is supplied to the pyrolysis unit 4. Further, an energy 24 obtained in the high temperature gasification unit 10 and energy utilization unit 13 is used for recycle in other plant.

Although the waste treatment method mentioned above is excellent in such a viewpoint that rough particle incombustible component contained in the waste can be used for recycle, the following problems are contained.

Conventionally, the pyrolysis gas 2 generated by carbonization and the pyrolysis char 6 obtained after the mechanical treatment are introduced to the high temperature gasification unit 10 at the same time and, then, a heating gas 9 is obtained by gas conversions of the pyrolysis gas 2 and pyrolysis char 6 in the high temperature gasification unit 10. However, it is difficult to satisfy an optimum condition for treating the pyrolysis gas 2 and pyrolysis char 6 at the same time, and as a result, the heating gas 9 cannot be obtained effectively from the pyrolysis gas 6. That is, there is a problem that gas treatment efficiency is not good.

Further, in the above described conventional waste treatment apparatus, chlorine contained in the waste 1 is combined with oxygen in the pyrolysis unit 4 so that harmful dioxin is generated, which provides a severe problem in viewpoint of environment pollution. Further, because the chlorine and the like are contained in the waste 1, the pyrolysis apparatus is likely to corroded by these materials, so that the apparatus is likely to be deteriorated.

Although, before the heating gas 9 is supplied to the energy utilization unit 13, desulfurization or other treatment is desirable in viewpoint of corrosion of the energy supply unit 13, such a treatment has not been done and therefore, the heating gas 9 obtained from the waste has not been effectively used.

SUMMARY OF THE INVENTION

A primary object of the present invention is to substantially eliminate defects or drawbacks encountered in the prior art mentioned above and to provide a waste treatment method for effectively carrying out gas conversion for pyrolysis gas and gasified gas conversion for pyrolysis char separately, in which gas processing efficiency on gas conversion for the pyrolysis gas and gasified gas conversion for the pyrolysis gas is improved.

Another object of the present invention is to provide a waste treatment apparatus for carrying out gas conversion of the pyrolysis gas and pyrolysis char separately to achieve effective waste treatment, the waste treatment apparatus being capable of reducing generation of dioxin and the like which are considered to be harmful by sealing from the air of the atmosphere during the pyrolysis.

A further object of the present invention is to provide a waste treatment method and waste treatment apparatus in which the waste is converted to gas, the gas being subjected to refining (cleaning) treatment and supplied to other equipment or systems to that it is used effectively as electric energy.

These and other objects can be achieved according to the present invention by providing, in one aspect, a waste treatment method comprising:

a pyrolysis step for pyrolysing waste containing organic substance in a condition sealed from an air so as to separate to a pyrolysis gas and a pyrolysis residue;

a gas cracking step for introducing the pyrolysis gas after the pyrolysis step to react an oxide component in the pyrolysis gas through an oxidization reaction and pyrolyse high molecular hydrocarbon in the pyrolysis gas with a heat generated by the oxidization reaction so as to obtain a cracked gas containing low molecular hydrocarbon.

a residue cooling step for cooling the pyrolysis residue generated in the pyrolysis step for solidification;

a mechanical processing step for crushing and sorting the pyrolysis residue solidified in the residue cooling step so as to obtain a pyrolysis char essentially consisting of pyrolysed organic substance and inorganic components; and a smelting and gasifying step for burning the pyrolysis char obtained in the mechanical processing step at a high temperature by being mixed with fuel and oxygen or air to melt the inorganic component of the pyrolysis char and gasify the carbon component to obtain a gasified gas containing low molecular hydrocarbon.

In a preferred embodiment of this aspect, the waste pyrolysis gas is kept at 1000–1200° C. for at least one second time in the gas cracking step. A pyrolysis residue material obtained by crushing the pyrolysis residue to fine particles in the mechanical processing step is sorted to metallic substance, pyrolysed organic substance and inorganic components so as to obtain the pyrolysis char essentially consisting of the pyrolysed organic substance and the inorganic component. The pyrolysed organic substance is heated at 1200–1600° C. in the smelting and gasifying step while the inorganic component is converted to slag.

The waste treatment method further comprises:

a gas cooling step for introducing the cracked gas obtained in the gas cracking step and a gasified gas obtained in the smelting and gasifying step; and a gas cleaning step, for obtaining a cleaned gas, including a washing treatment for washing the gas, a desulfurization treatment for removing the hydrogen sulfide and a residual organic gas removal treatment for absorbing residual organic gas with an activated charcoal filter after the gas cooling step for cooling the cracked gas and the gasified gas.

The waste treatment method further comprises the steps of compressing a cleaned gas obtained from the gas cleaning step and then temporarily storing the cleaned gas, the stored gas being then supplied to a gas utilization equipment such as a gas engine and a boiler. The method may further comprises either one set of the steps of recovering a hear from a combustion gas in the pyrolysis step, heating the air be the recovered combustion air for the pyrolysis step and the steps of providing a heat insulating material around a smeltor/gasifier unit in the smelting and gasification step and supplying a hear energy of a hot water generated through a water cooling process to a treatment equipment. A gas generated through the waste treatment is stored and supplied as a heating source for the pyrolysis unit or a heating source for the smeltor-gasifier unit at the smelting and gasification step. The generated heat may be supplied to the treatment equipment as thermal energy source or electric energy source.

According to this aspect of the present invention, the pyrolysis gas obtained in the pyrolysis step is introduced solely to gas cracking, i.e. modifying, step and then cracked. On the other hand, the pyrolysis residue is subjected to the smelting and gasification treatment in a special process. Therefore, the pyrolysis gas and pyrolysis residue can be subjected to an appropriate treatment depending on each processing amount. As a result, the pyrolysis gas can be effectively converted to a fuel gas thereby improving the gasification efficiency.

When the pyrolysis gas having a large amount of organic substance is directly used for burning, an undesired influence such as corrosion of equipment, undesired smell and smoke is produced. However, the present invention is capable of preventing these undesired influences by cracking and modifying the gas.

Furthermore, according to the present invention, by heating the pyrolysis gas at temperatures of 1000–1200° C., the high molecular hydrocarbon component in the pyrolysis gas is thermally decomposed so as to obtain the cracked gas containing low molecular hydrocarbon.

Still furthermore, according to the present invention, since the metallic substance in the pyrolysis residue is sorted and recovered, this metallic substance can be recycled as a useful thing. The pyrolysed component in carbide can be gasified by high temperature combustion so that the waste can be recycled as a useful recycle-matter and energy source. Heavy metal and the like which are contained in the waste and have not been recovered as metal are solidified in the form of glass-like slag so that they will not flow out in the environment.

Still furthermore, according to the present invention, because the residue of the waste is gasified for use as fuel, the amount of the residue is reduced, so that a large disposal place is not required and a high transportation cost is also not required, thereby providing an economic effect. Furthermore, since the gas generated by the waste treatment is used after a treatment for reducing an influence of corrosion and undesired smell is done, it is possible to provide a facility being free of pollution such as corrosion of equipment and undesired smell.

Still furthermore, according to the present invention, the refined gas stored temporarily is supplied to a gas engine or boiler and converted to energy for use in the waste treatment process and additionally this energy can be sold as electric power. Effective use of the energy can be achieved by supplying the energy obtained by waste treatment to a waste treatment facility or other treatment facility.

Still furthermore, according to the present invention, by storing gas temporarily, the gas supply can be stably achieved to keep constant the generation amount thereof and to prevent a large pulsation from occurring.

Still furthermore, according to the present invention, cost involved for the waste treatment can be minimized by using gas stored in the gas holder as a heating source for the pyrolysis unit such as furnace and smeltor/gasifier unit such as furnace and by converting this gas to electric energy at a gas power plant for use as part or all of energy to be consumed in the waste treatment facility. The operation cost can be also reduced by storing gas temporarily and using the cleaned gas as a heat source for the waste treatment process.

In another aspect of the present invention, there is provided a waste treatment apparatus for treating a waste containing organic substance comprising:

a pyrolysis unit such as furnace for introducing and pyrolysing the waste in a condition sealed from air so as to separate to a pyrolysis gas and a pyrolysis residue;

a gas cracking unit operatively connected to the pyrolysis unit for introducing the pyrolysis gas generated in the pyrolysis unit and reacting an oxide component in the pyrolysis gas through an oxidization reaction so as to thermally decompose high molecular hydrocarbon component in the pyrolysis gas with a heat generated by the oxidization reaction so as to obtain a cracked gas containing low molecular hydrocarbon;

a residue cooling unit for introducing the pyrolysis residue generated in the pyrolysis unit and cooling the residue for solidification thereof;

a mechanical processing unit for crushing and sorting the solidified pyrolysis residue to obtain a pyrolysis char essentially consisting of pyrolysed organic substance and inorganic component;

a smelting and gasification unit (smeltor/gasifier) for burning the pyrolysis char at a high temperature sorted by the mechanical processing unit by being mixed with fuel and oxygen or air so as to melt the inorganic component of the pyrolysis char and for gasifying the carbon component to obtain gasified gas containing low molecular hydrocarbon;

a gas cooling unit for the cracked gas obtained in the gas cracking unit and the gasified gas obtained in the smelting and gasification unit;

a gas cleaning unit for removing impurity contained in the gas to obtain a cleaned gas;

a gas compressor for compressing the cleaned gas obtained by the gas cleaning unit; and a gas holder for storing the compressed cleaned gas.

In a preferred embodiment of this aspect, the mechanical processing unit comprises a crusher for crushing pyrolysis residue and a sorter for sorting metal, pyrolysed organic substance and inorganic component.

The apparatus may further comprise a gasified gas cooling unit for rapidly cooling gasified gas provided at an outlet of the smelting and gasification unit. The gas cooling unit is a boiler or other heat exchanger for recovering heat energy possessed by gas and cooling the gas. The gas cleaning unit comprises a gas washing means for washing gas, a desulfurization means for removing hydrogen sulfide, and an activated charcoal filter means for absorbing residual organic gas.

The pyrolysis unit has a double cylindrical structure comprising an inner cylinder to which the waste is introduced and an outer cylinder disposed outside the inner cylinder for heating the inner cylinder, the inner cylinder has a length longer than that of the outer cylinder so that both ends of the inner cylinder project over both ends of the outer cylinder, the projecting portion being supported by a roller to be rollable and at least the inner cylinder being inclined at a downward gradient of less than 5° from a waste intake side to an outlet side.

The apparatus may further be provided with a combustion chamber in which a space is defined between the inner cylinder and outer cylinder of the pyrolysis unit, the space being divided into a plurality of sections in an axial direction of the outer cylinder, and the inner cylinder being heated by passing combustion gas through the space sections.

A press means for compression on a loading side is provided at a waste loading portion of the pyrolysis unit and an end resistant plate for compressing the waste is provided at an outlet of the press means, and a scraper may be disposed for scraping compressed waste provided outside the end resistant plate.

A press means for compression on the discharging side may be provided at a pyrolysis residue discharging portion of the pyrolysis unit, and an end resistant plate for compressing the waste may be also provided at an outlet of the press means.

According to this other aspect of the present invention, by gasifying the pyrolysis gas and pyrolysis residue separately in each treatment unit, the gas conversion can be achieved effectively and the efficiency of the gasification processing can be improved.

Furthermore, according to this aspect of the present invention, since the pyrolysis residue is crushed and gasified or converted to melted slag, as compared to the conventional reclamation treatment and burning treatment, the volume reduction effect is large, so that the amount of the secondary disposal object is largely reduced, thereby making it easy to secure a reclamation place. Therefore, a relating environmental problem can be solved.

Still furthermore, according to the present invention, by stabilizing chlorinated hydrocarbon contained in the waste and halogenated molecular component at high temperatures of about 1400° C. and after that, cooling up to less than 100° C. rapidly with a gasified gas cooling unit, it is possible to prevent formation of gas components to dioxin or the like in a low temperature range (in the vicinity of 300° C.). Thus, the harmful substance can be converted to a stabilized combustion product not affecting the environment. Since the gas exhausted from the gas cracking unit such as furnace or smeltor/gasifier unit has a temperature as high as 400–500° C., this gas is not suitable for being subjected to gas cleaning or refining treatment provided on the post stage. Therefore, in order to make effective use of thermal energy possessed by gas before being subjected to the gas treatment, the exhaust gas is cooled with a boiler or other heat exchanger and converted to heated vapor thereby achieving utilization of heat. Further, by rapidly cooling the gas discharged from the gas cracking unit and the smeltor/gasifier unit, it is possible to prevent harmful substance such as dioxin or the like from forming.

Still furthermore, according to the present invention, before the mixed gas of the cracked and modified gas containing low molecular hydrocarbon and gasified gas is stored, hydrogen chloride is washed off by the gas washing unit, hydrogen sulfide is removed by the desulfurization unit and then undissolved gas and remaining harmful substance such as remaining dioxin are absorbed to purify the gas. Thus, since the gas is converted to a refined gas cleaned for the environment, there is no danger that harmful substance for the environment is discharge, and corrosion of apparatus and pipe constituting an energy application equipment is prevented, thereby ensuring a long service life of the apparatus.

Still furthermore, according to the present invention, the inner cylinder is inclined and the roller for supporting the inner cylinder is provided so that the inner cylinder is rolled. Therefore, the waste loaded into the pyrolysis unit is rolled by the rotation of the inner cylinder in the pyrolysis unit so that it is progressed gradually and dissolved to the pyrolysis gas and the pyrolysis residue, thereby finally being discharged in the form of gas and fluid. Although the degree of waste decomposition by heat depends on heating temperature, rotation speed of the inner cylinder and inclination angle thereof, by dividing the combustion chamber to more than four compartments and then controlling the temperature of the combustion chamber, the heating temperature of the inner cylinder can be controlled easily.

Still furthermore, according to the present invention, the waste is extracted with the screw press at the loading section of the pyrolysis unit and compressed with the resistant plate so that no more air having a size than a gap formed in the waste enters even if the waste is continuously loaded inside the pyrolysis unit, and therefore, it is possible to prevent the pyrolysis gas therein from directly contacting the atmosphere. Thus, combination of chlorine contained in the waste and oxygen in the atmosphere can be prevented, so that generation of dioxin by combination of chlorine and oxygen can be minimized.

According to the present invention, by providing with the scraper, it is possible to thinly scrape the waste adhering to the resistant plate. Therefore, the heat is transmitted easily to the waste in the pyrolysis unit so that the pyrolysis, i.e. thermal decomposition, is easy to be progressed. Therefore, it becomes possible to thermally decompose even a waste having a size of more than 50 mm, which could not be treated by a conventional apparatus.

Still furthermore, according to the present invention, since the pyrolysis residue discharging portion of the pyrolysis unit is sealed from the air by the screw press, the pyrolysis gas generated inside the pyrolysis unit is sealed from the air. Therefore, it is possible to prevent generation of dioxin by combination of chlorine contained in the pyrolysis gas and oxygen in the atmosphere.

In summary, as described above, according to the present invention of the characters described above, gas can be obtained without any waste as compared to the conventional technology and an amount of secondary waste can be largely reduced by treating the pyrolysis gas and pyrolysis residue produced by the pyrolysis, i.e. thermal decomposition, separately. Furthermore, no air is mixed on the pyrolysis state, and therefore, generation of dioxin and the like which is a harmful substance can be reduced, and by using the cleaned gas obtained by washing the gas produced from waste or desulfurization thereof, corrosion on equipment or apparatus to which the gas is to be supplied can be prevented.

The nature and further characteristic features of the present invention will be made more clear from the following descriptions made with reference to the accompanying drawings.

DESCRIPTION OF THE PREFERRED EMBODIMENT

A preferred embodiment of the present invention will be described hereunder with reference to FIGS. 1 to 5.

Figure 1:
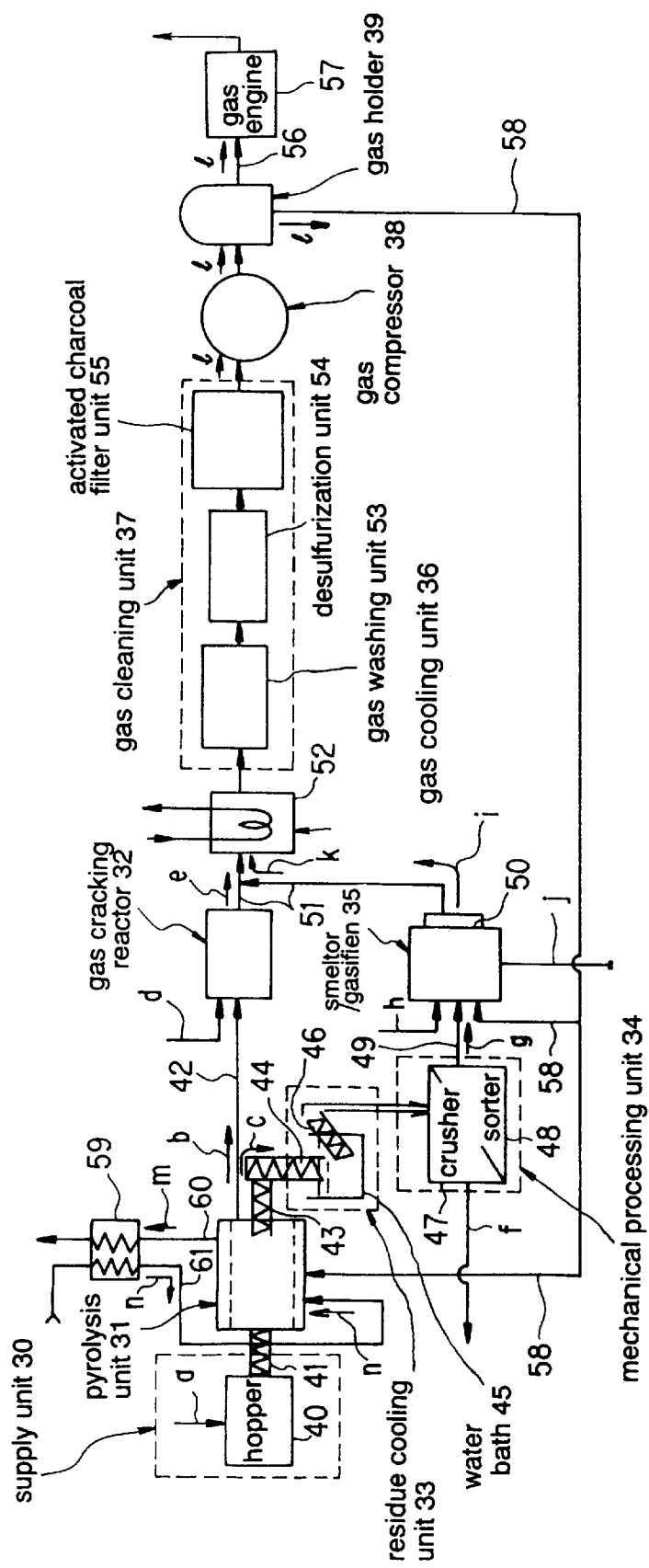
FIG. 1 is a structure diagram showing a waste treatment method of one embodiment of the present invention.

FIG. 1 is a structure diagram showing a waste treatment (disposal) apparatus of the present invention.

As shown in FIG. 1, the waste treatment apparatus comprises a supply unit 30 for supplying waste containing organic substance and a pyrolysis (thermal decomposition) unit 31 such as furnace which is connected to the supply unit 30 for pyrolysing waste, as a treatment unit at the initial stage thereof and further a gas cracking reactor 32 such as modifier for thermally decomposing a pyrolysis gas generated in the pyrolysis furnace 31 to crack the gas, which is placed at a post stage.

Further, the apparatus further includes a residue cooling unit 33 which is disposed in parallel to the gas cracking reactor 32 for cooling a pyrolysis residue generated in the pyrolysis 31 and a mechanical processing unit 34 which is connected to this residue cooling unit 33 for crushing and selecting the pyrolysis residue, and a melting/gasification furnace 35 (smeltor/gasifier) is placed at the post stage thereof for burning a pyrolysis char selected by the mechanical processing unit 34 under high temperatures for gasification.

Gas pipes from the gas cracking reactor 32 and the smeltor/gasifier 35 are joined together and a gas cooling unit 36 for cooling gas is provided in the downstream thereof. A gas cleaning (refining) unit 37 for removing impurity from gas is provided at a post stage thereof. Further, a gas compressing unit 38 for compressing cleaned gas and a gas holder 39 for storing the compressed cleaned gas are provided on a post stage of this gas cleaning unit 37.

The waste supply unit 30 which is a treatment unit at the initial stage comprises a hopper 40 for receiving waste a and a screw press 41 which is connected to this hopper 40 for loading side compression. The waste a compressed by this screw press 41 is supplied into the pyrolysis furnace 31.

The pyrolysis furnace 31 pyrolyses the waste a to separate it to a pyrolysis gas b and a pyrolysis residue c. The gas cracking reactor 32 is connected to the waste discharge side of the pyrolysis furnace 31 through a gas pipe 42 so as to introduce the pyrolysis gas b generated in the pyrolysis furnace 31 to the gas cracking reactor 32.

The gas cracking reactor 32 is a device for cracking or modifying the pyrolysis gas b, in which the pyrolysis gas b and an oxygen d in the air react with each other through an oxidization process to thermally decompose high molecular hydrocarbon component in the pyrolysis gas b thereby obtaining a cracking gas e containing low-molecular hydrocarbon.

A screw press 43 for discharging the pyrolysis residue c generated in the pyrolysis furnace 31 is connected to the waste discharge side of the pyrolysis furnace 31 in parallel to the gas pipe 42 connected to the gas cracking reactor 32 and the pyrolysis residue c is introduced to the residue cooling unit 33 through the screw press 43.

The residue cooling unit 33 introduces the pyrolysis residue c from the screw press 43 for compression on the discharge side and solidifies the pyrolysis residue c through the cooling process. The residue cooling unit 33 comprises a screw press 44 connected to the screw press 43 for compression on the water bath introduction side, a water bath 45 for storing the water to be charged from the screw press 44 and a screw press 46 which fetches out the solidified pyrolysis residue c from the water bath 45 for compression on the water bath discharge side. The solidified pyrolysis residue c is introduced to the mechanical processing unit 34 provided on the post stage through a conveyor described later.

The mechanical processing unit 34 comprises a crusher 47 for crushing the pyrolysis residue c into fine powder or particles and a sorter 48 which is provided on the post stage thereof for sorting the crushed pyrolysis residue c to metallic substance, pyrolysed organic substance and inorganic component. The metallic substance f sorted by this sorter 48 is recovered and the pyrolysis char g essentially consisting of the pyrolysed organic substance, and inorganic component is supplied to the smeltor/gasifier 35 through the gas pipe 49.

The smeltor/gasifier 35 is an apparatus for burning the crushed pyrolysis char g by mixing gaseous fuel and oxygen h at high temperatures. In the smeltor/gasifier 35, the carbon component in the pyrolysis char g is gasified to obtain gaseous gas i containing low molecular hydrocarbon and the inorganic component is melted and solidified in a glass state and then recovered as inorganic material j for recycle use. A gasified gas cooling unit 50 is provided on the discharge side of the smeltor/gasifier 35 and the high temperature gaseous gas i is cooled rapidly by this gasified gas cooling unit 50.

Gas pipes 51 of the gas cracking reactor 32 and smeltor/gasifier 35 are joined together so that the cracked gas e and gaseous gas i join together to produce mixed gas k. The mixed gas k is introduced to the gas cooling unit 36 provided in the downstream side.

This gas cooling unit 36 contains a boiler 52 for cooling the mixed gas k, and a thermal energy possessed by the mixed gas k is recovered by this boiler 52 to cool the mixed gas k. The cooled mixed gas k is then introduced into the gas cleaning unit 37 provided on a post stage of the gas cooling unit 36.

The gas cleaning unit 37 comprises a gas washing unit 53 for washing the mixed gas k, a desulfurization unit 50 which is connected on a post stage of this gas washing unit 53 for removing hydrogen sulfide, and an activated charcoal filter unit 51 which is provided on a post stage of the desulfurization unit 50 for absorbing residual organic gas. The mixed gas k is refined by the gas refining unit 37 and a cleaned gas l is introduced to the gas compressing unit 38.

The gas holder 39 is provided on a post stage of this gas compressing unit 38 and the cleaned gas l is stored by the gas holder 39. The stored cleaned gas l is supplied to a gas engine 57 through a supply pipe 56 connected to the downstream side of the gas holder 37 as required. Another gas supply pipe 58 is connected to the gas holder 37 and the refined gas l is supplied to the pyrolysis furnace 31 and the smeltor/gasifier 35 in the form of furnace through the gas supply pipe 58.

A heat exchanger 59 is connected to the pyrolysis furnace 31 so that combustion gas m generated by combustion in the pyrolysis furnace 31 is supplied to one side of the heat exchanger 59 through a combustion gas pipe 60. Further, an air supply pipe 61 for supplying the combustion air n for use as heating source in the pyrolysis furnace 31 is connected to the heat exchanger 59 and the combustion air n whose temperature has been raised is fed to the pyrolysis furnace 31 through the air supply pipe 61 to improve combustion efficiency of the pyrolysis furnace 31.

The pyrolysis furnace 31 of this embodiment carries out the pyrolysis processing by using double structure combustion furnace comprising inner and outer cylinders.

Figure 2:
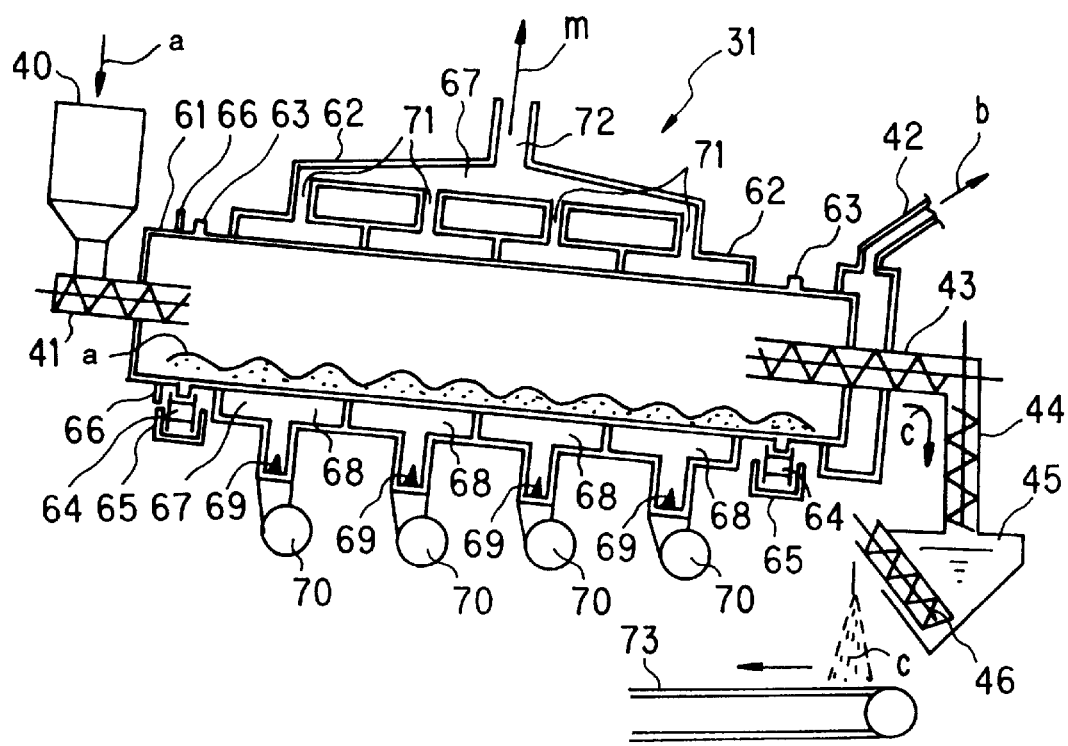
FIG. 2 is a sectional view showing a structure of a pyrolysis (thermal decomposition) furnace in the embodiment of FIG. 1.

FIG. 2 is a sectional view showing a structure of the pyrolysis furnace 1.

As shown in FIG. 2, the pyrolysis furnace 31 has such a double structure including the inner cylinder 61 in which waste a is introduced and the outer cylinder 62 which is provided outside the inner cylinder 61 for heating the inner cylinder 61. This pyrolysis furnace 31 is inclined at a downward gradient of more than an angle of 5° from a loading side for the waste a to the discharging side. The inner cylinder 61 has a length longer than the outer cylinder 62 and both ends of the inner cylinder 61 are projected from both ends of the outer cylinder 62.

A ring-like supporting plate 63 is provided on each of both end portions of this inner cylinder 61 and these supporting plates 63 are supported by supporting bases 65 through rollers 64 so that they are capable of rotating. A ring-like sprocket 66 is provided on an outside periphery on an end of the waste loading side projected of the inner cylinder 61 and a motor which is a driving power source (not shown) is interconnected to this sprocket 66 through a chain so as to rotate the inner cylinder 61.

A space portion 67 is formed between the inner cylinder 61 and outer cylinder 62 of the pyrolysis furnace 31. At least four independent combustion chambers 68 are provided along the axial direction of the outer cylinder 62 so as to surround the inner cylinder 61. Fuel supply system (not shown) is provided on the bottom of each of the combustion chambers 68 and a burner 69 for burning supplied fuel is also provided. Fuel is burnt by the burner 69 with air supplied from each blower 70 to each of the combustion chambers 68 and combustion gas is circulated in each combustion chamber 69 to heat the inner cylinder 61.

A measuring unit (not shown) for measuring a temperature of each section is provided in each independent combustion chamber 68 so as to control combustion.

Exhaust gas paths 71 and exhaust gas pipe 72 for discharging combustion gas m are provided on top of each combustion chamber 68 and the combustion gas is supplied to other equipment therethrough.

A degree of decomposition by heat of the waste a introduced to the pyrolysis furnace 31 depends on a heating temperature, a rotation speed of the inner cylinder 61 and inclination angle thereof. Thus, by controlling the combustion by the burner 69 and rotation speed of the inner cylinder 61, the pyrolysis of the waste a is carried out to decompose to the pyrolysis gas b and the pyrolysis residue c. These are discharged in the form of gas or fluid.

The thermal pyrolysis gas b is supplied to the gas cracking reactor 32 through the gas pipe 42. On the other hand, the pyrolysis residue c is transported through the screw press 43, the water bath 45 and the screw press 46 and then carried by the conveyor 73 and introduced to the mechanical processing unit 34.

Figure 3:
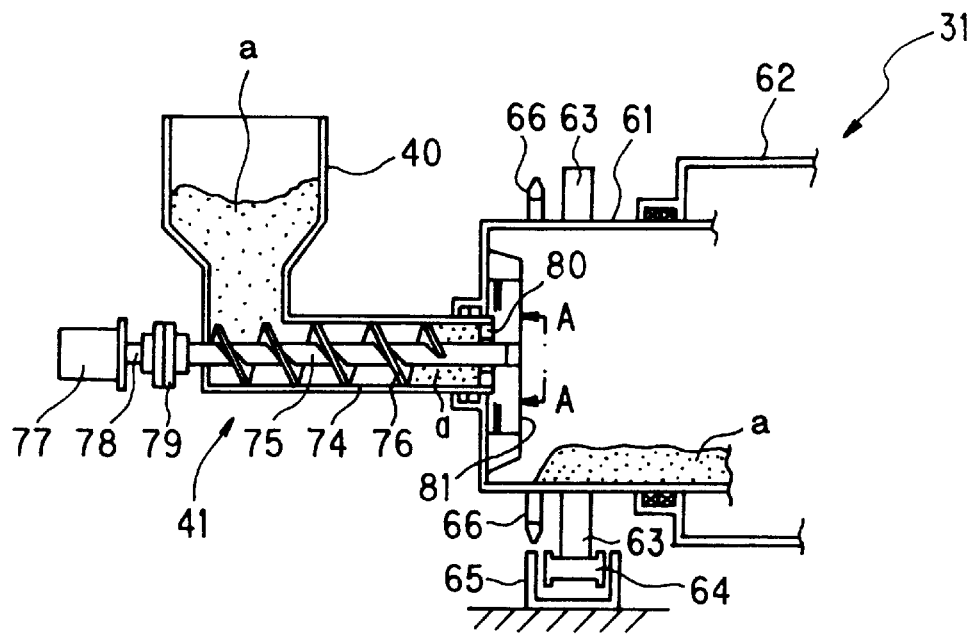
FIG. 3 is a sectional view showing a structure of a waste loading portion of the pyrolysis furnace.
Figure 4:
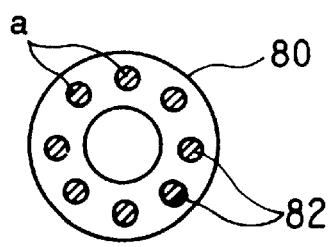
FIG. 4 is a sectional view taken along the line IV—IV of FIG. 3.

FIG. 3 is a sectional view showing by enlargement a structure of the waste loading portion of the pyrolysis furnace 31 and FIG. 4 is a view taken along the line IV—IV of FIG. 3.

As shown in these figures, an end in the axial direction of the screw press 41 is connected to the hopper 40 for receiving the waste a. The other end of this screw press 41 is connected to the pyrolysis furnace 31, and the screw press 41 is disposed coaxially with the pyrolysis furnace 31.

In the screw press 41, a rotation shaft 75 is provided in a cylindrical casing 74 connected to the hopper 40 and a spiral screw 76 is mounted on a periphery of this rotation shaft 75.

A rotation drive unit 77 such as an electric motor, hydraulic motor or the like, which is an rotation driving source, is disposed at a hopper 40 side end of the rotation shaft 75. The rotation shaft 75 of the screw press 41 is connected to an output shaft 78 of the rotation drive unit 77 through a flexible shaft coupling 79.

Further, a jaw-like resistant plate 80 in the form of end plate for compressing the waste to be forced out is provided at the waste force out position located between the screw press 41 and inner cylinder 61 so that it is disposed perpendicular to the rotation shaft 75.

A scraper 81 for scraping the waste is provided further on an inner cylinder 61 side relative to the end plate 80. This scraper 81 is disposed at four to eight positions on the circumference of the end plate 80. As a result, the waste a to be forced out from the screw press 41 is compressed by the end plate 80, discharged through holes 82 in the end plate 80 and scraped by the scraper 81 to be introduced to the bottom inside face of the inner cylinder 61.

The end plate 80 has a plurality of or, for example, eight holes 82, which are spaced in the circumferential direction as shown in FIG. 4. The waste a forced out from the screw press 39 is blocked by the end plate 80 so that it is compressed and a part of the compressed waste passes through the holes 82 in succession. The waste a is compressed by a pressure corresponding to the resistance of the end plate 80 and the inside of the pyrolysis furnace 31 is separated from atmosphere in the hopper 40 by such compression force.

Figure 5:
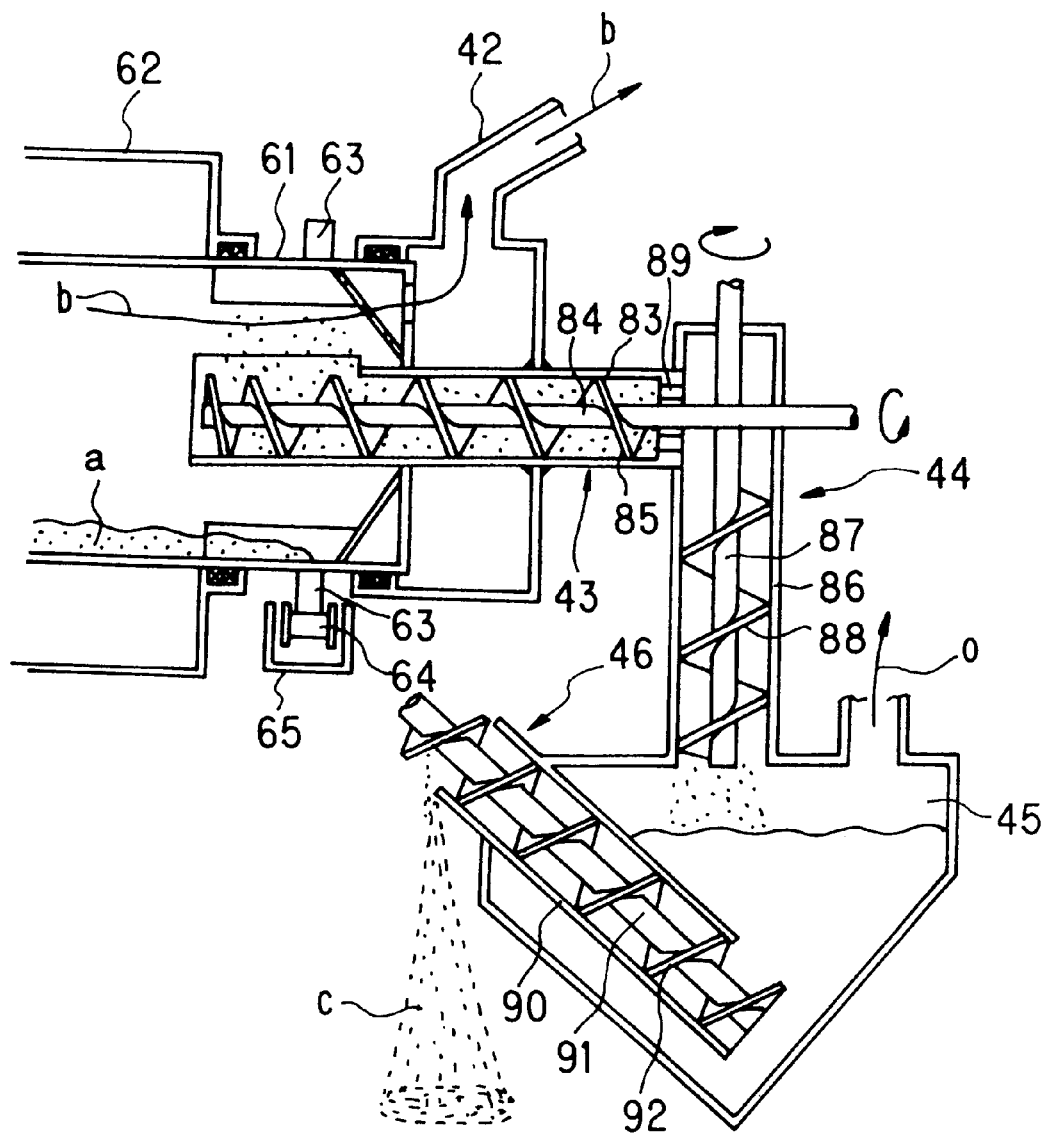
FIG. 5 is a sectional view showing a structure of a waste discharging portion of the pyrolysis furnace.
Figure 6:
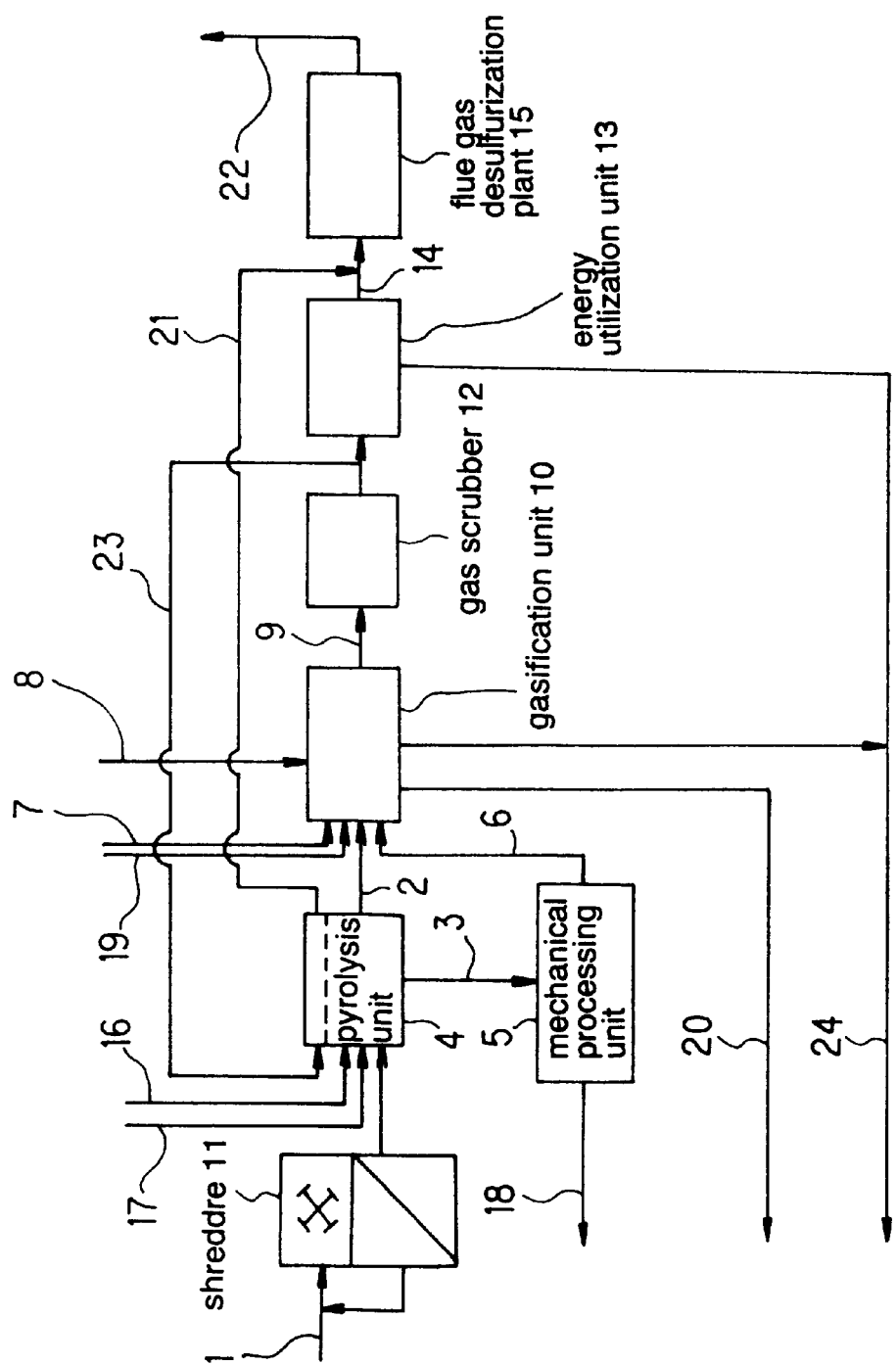
FIG. 6 is a structure diagram showing a conventional waste treatment apparatus.

FIG. 5 is a sectional view showing a structure of the waste discharging side of the pyrolysis furnace 31.

As shown in FIG. 5, an end in the axial direction of the screw press 43 for compression on the discharging side for discharging the pyrolysis residue from the pyrolysis furnace 31 is connected thereto for pyrolysing the waste a to separate to the pyrolysis gas b and the pyrolysis residue c. The other end of the screw press 43 is connected to the screw press 44 for compression on the water bath introduction side and disposed in a direction perpendicular to the screw press 43. The water bath 35 in which water is stored is connected to a bottom position of the screw press 44 for the compression on the water bath introduction side. Further, the screw press 46 for the compression on the water bath discharging side is connected to the water bath 45.

An end portion of the screw press 43 for compression on the discharging side for discharging the pyrolysis residue c from the pyrolysis furnace 31 is inserted thereinto. The rotation shaft 84 is provided in the cylindrical casing 83 connected to the pyrolysis furnace 31 through an opening made on a top of the inserted end portion. The spiral-like screw 85 is provided on the periphery of this rotation shaft 84.

A rotation drive unit such as an electric motor, hydraulic motor or the like is provided at an end on the water bath 45 side of the rotation shaft 84. The rotation shaft 84 of the screw press 43 is connected to the output shaft of this rotation drive unit through a flexible shaft coupling.

A side of the top portion of the screw press 44 for compression on the water bath introduction side is connected to the screw press 43 for compression on the discharging side and the bottom end thereof is connected to the water bath 45. In this screw press 44, a rotation shaft 87 is provided in the cylindrical casing 86 provided in a direction perpendicular to the screw press 43 and the spiral screw 88 is provided on the periphery of the rotation shaft 87.

A rotation drive unit such as an electric motor, hydraulic motor or the like which is a rotation driving source is disposed at a top portion of the rotation shaft 87. The rotation shaft 87 of the screw press 44 is connected to the output shaft of the rotation drive unit in the axial direction through a flexible shaft coupling.

A jaw-like resistant plate 89 in the form of end plate for compressing the waste a to be forced out is provided at a position for forcing out the waste from the screw press 43 for the compression on the discharging side to the screw press 44 for the compression on the water bath introduction side, the end plate being disposed perpendicular to the rotation shaft 84. The end plate 89 has a plurality of or, for example, eight holes which are spaced in the circumferential direction like the end plate 80 shown in FIG. 4. The waste forced out from the screw press 43 is blocked by the end plate 89 so that it is compressed and part of the compressed waste a passes through the holes in succession. The waste a is then compressed by a pressure corresponding to the resistance of the end plate 89 and the inside of the pyrolysis furnace 31 is separated from atmosphere in the water bath 45 by this compression force.

The water bath 45 is a vessel disposed for storing water to immerse the carbonized residue c in water for solidification. An induction fan, not shown, for inducing vapor o generated in a large quantity when high temperature pyrolysis residue c is cooled rapidly is provided outside the water bath 45.

Further, the screw passes 46 for compression on the water bath discharging side is provided in this water bath 45 with a bottom end portion thereof being immersed in the water bath 45 and a top end portion thereof being projected over the water bath 45. This screw press 46 is disposed in such a condition in which it is inclined downward from the top end portion to the bottom end portion.

In the screw press 46 for compression on the water bath discharging side, a rotation shaft 91 is provided in a cylindrical casing 90, in which top and bottom ends thereof are opened and a spiral screw 92 is provided on the periphery of this rotation shaft 91.

A rotation drive unit such as an electric motor, hydraulic motor or the like which is a rotation driving source is disposed on a top end side of the rotation shaft 91. The rotation shaft 91 of the screw press 46 is connected to the output shaft in the axial direction of the rotation drive unit.

A conveyor is provided just below the top end portion of the screw press 46 projected, so that the solidified pyrolysis residue c is carried.

Further the waste treatment method of this embodiment will be described hereunder.

The metallic substance is separated and removed from the waste a and contains organic substances cut in size of 50 mm or more and near 50 mm as its main component.

After the waste a is loaded in the hopper 40, the waste is extracted horizontally by the screw press 41 and the compressed waste is supplied into the pyrolysis furnace 31.

As shown in FIG. 3, the waste a loaded in the hopper 40 is extracted horizontally by the rotation shaft 75 and screw 76 driven by the rotation drive unit 77, rolled by the rotation of the inner cylinder 61 and advanced gradually to the discharging side while being heated. The waste a is compressed by the end plate 80 provided on the discharging side of the pyrolysis furnace 31 and the compressed waste a is supplied into the inner cylinder 61 of the pyrolysis furnace 31.

The waste a supplied into the pyrolysis furnace 31 is pyrolysed therein, sealed form the air and separated from the pyrolysis gas b and pyrolysis residue c.

The pyrolysis gas b obtained by the pyrolysing in the pyrolysis furnace 31 is introduced to the gas cracking reactor 32, in which the oxidization reaction between the pyrolysis gas b and oxygen d is carried out. The pyrolysis gas b is kept under temperatures of 1000–1200° C. for at least one second time with a heat generated in the oxidization reaction so as to pyrolyse the high molecular hydrocarbon component in the pyrolysis gas b to the cracked gas e which is low molecular hydrocarbon.

On the other hand, the pyrolysis residue c is extracted horizontally from the rotating pyrolysis furnace 31 by the screw press 43 and compressed by the end plate 89. The compressed pyrolysis residue is introduced into the water bath 45 through the screw press 44.

The pyrolysis residue c is cooled and solidified by the water bath 45. The solidified pyrolysis residue c is crushed to fine particles by the crusher 47 and introduced to the sorter 48, in which the metallic substance, the pyrolysed organic substance and the inorganic substance are sorted. The metallic substance i is recovered and, the pyrolysis char f essentially consisting of the pyrolysed organic substance and the inorganic substance is introduced to the smeltor/gasifier 35.

In the smeltor/gasifier 35, the pyrolysis char f is burnt at night temperatures of 1200–1600° C. by being mixed with fuel and oxygen h so as to obtain gaseous gas i containing low molecular hydrocarbon by gasifying the carbon component of the pyrolysis char f.

The mixed gas k containing the cracked gas e and gaseous gas i obtained in the above manner are introduced to the boiler 52 and cooled rapidly. After the mixed gas k is washed by the gas washing unit 53, hydrogen sulfide is removed by the desulfurization unit 54. Then, the residual organic gas is removed by the activated charcoal filter 55 to remove the residual organic gas. The gas is compressed by the gas compressing unit 38 and the cleaned gas l is stored in the gas holder 39.

The cleaned gas l stored in the gas holder 39 is supplied to the gas engine 57 or the boiler, the pyrolysis furnace 31 and the smeltor/gasifier 35 as required.

According to the waste treatment method described above, because the pyrolysis gas b and the pyrolysis residue c obtained from the pyrolysis furnace 31 are treated separately, the operation is facilitated and further, the efficiency of the gasification treatment can be improved.

Specifically, by treating the pyrolysis residue c separately, the vapor o and thermal decomposition gas b can be shut out easily. Therefore, a danger of explosion can be eliminated and the treatment procedure for the waste can be facilitated.

Even if heavy metal is mixed in the pyrolysis residue c, the heavy metal is enclosed in glass state by burning it at high temperatures in the mechanical processing unit 34 and the smeltor/gasifier 35, so that a danger that it is meted out is eliminated, thereby facilitating the procedure.

Further, by burning the pyrolysis residue c for gasification, gas can be obtained from the pyrolysis residue c which is a secondary waste. Therefore, the efficiency of the gasification treatment can be improved and further, because an amount of the pyrolysis residue c is largely reduced by gasification of the pyrolysis residue c, there are produced a great deal of advantages like allowing a long time use of the reclamation ground.

In such a structure, by connecting the screw presses 43, 44 to the pyrolysis 31, the pyrolysis gas b generated in the pyrolysis furnace 31 can be separated from the air, so that an amount of dioxin which is produced by combination of chlorine contained in the pyrolysis gas b with the oxygen d in the air can be largely reduced.

The combustion gas m from the pyrolysis furnace 31 is passed through one side of the heat exchanger 59 and the combustion air n for use as a heating source for the pyrolysis furnace 31 is passed through the other side thereof so as to raise the temperature of the combustion air n, thereby improving the combustion efficiency of the pyrolysis furnace 31.

According to the structure of this embodiment, because the end plate 80 is provided with the scraper for scraping the waste and the compressed waste a passing through the end plate 80 is scraped thinly, there is an advantage that heat is easy to transmit to the waste in the pyrolysis furnace 31 so that the pyrolysis progresses easily. Therefore, even if the size of the waste is more than 50 mm, there is no obstacle in pyrolysis treatment.

Although the known example is restricted to waste essentially consisting of metallic junks on which organic substance adheres and cut to fine particles of less than 50 mm, the embodiment of the present invention is capable of treating not only waste cut to fine pieces of more than 50 mm, but also industrial and domestic or the like waste containing paper, plastic and wood piece fixedly formed in lump through the compression and mainly containing organic substance in intermediate treatment stage.

Although the known example aims to treat the waste essentially consisting of metallic junks, since the embodiment of the present invention is so constructed that the metallic junks are removed by a sorter before the waste is loaded to the pyrolysis stage, there is no problem in partial mixing of the metallic junks. However, an object of the present invention is to treat the waste essentially consisting of an organic substance.

Therefore, the size of the waste is not restricted to pieces cut to less than 50 mm, but the treatment object of the present invention is waste cut to pieces, more than 50 mm and near 50 mm, and solid fuel (RDF) of waste produced at other places. Therefore, raw material which the present invention handles can be obtained easily.

Furthermore, according to this embodiment, since a part or all of thermal energy or electrical energy for use in the treatment of waste can be filled by gas generated in waste treatment or disposal, the present invention achieves effective use of the energy. Furthermore, by using the gas cleaned by washing the gas obtained in waste treatment or desulfurization, corrosion on an equipment to which gas is to be supplied can be prevented.

Since an interior of the smeltor/gasifier 35 in the form of furnace reaches a high temperature, its furnace wall needs to be cooled. Furthermore, by using the thermal energy of hot water produced by cooling heat insulating material provided in the smeltor/gasifier 35 with water, the gas produced by the waste treatment can be used as a heating source for the pyrolysis furnace 31 or a heating source in the smeltor/gasifier 35.

Further, it is to be noted that the present invention is not limited to the described preferred embodiment and many other changes or modifications may be made without departing from the scopes of the appended claims.

For example, in the described embodiment, although the boiler 52 is employed as the gas cooling unit 36 which recovers thermal energy possessed by gas and cools the gas, it is permissible to use other heat exchanger instead of the boiler 52.

Furthermore, although the screw presses 41, 42 are used as loading portion or discharging portion for the pyrolysis residue c, it is permissible to use hydraulic press instead of the screw presses.

What is claimed is:
1. A waste treatment method comprising:
 a pyrolysis step for pyrolysing waste containing organic substance in a condition sealed from an air so as to separate to a pyrolysis gas and a pyrolysis residue;
 a gas cracking step for introducing the pyrolysis gas after the pyrolysis step so as to react an oxide component in the pyrolysis gas through an oxidization reaction and pyrolysing high molecular hydrocarbon in the pyrolysis gas with a heat generated by the oxidization reaction so as to obtain a cracked gas containing low molecular hydrocarbon;

a residue cooling step for cooling the pyrolysis residue generated in the pyrolysis step for solidification;

a mechanical processing step for crushing and sorting the pyrolysis residue solidified in the residue cooling step so as to obtain a pyrolysis char essentially consisting or pyrolysed organic substance and inorganic components; and a smelting and gasifying step for burning the pyrolysis char obtained in the mechanical processing step at a high temperature by being mixed with fuel and oxygen or air so as to melt the inorganic component of the pyrolysis char and gasify the carbon component to obtain a gasified gas containing low molecular hydrocarbon.

2. A waste treatment method according to claim 1, wherein the pyrolysis gas is kept at 1000–1200° C. for at least one second time in the gas cracking step.

3. A waste treatment method according to claim 1, wherein a pyrolysis residue material obtained by crushing the pyrolysis residue to fine particles in the mechanical processing step is sorted to metallic substance, pyrolysed organic organic substance and inorganic components so as to obtain the pyrolysis char essentially consisting of the pyrolysis organic substance and the inorganic component.

4. A waste treatment method according to claim 1, wherein the pyrolysed organic substance is heated at 1200–1600° C. in the smelting and gasifying step while the inorganic component is converted to slag.

5. A waste treatment method according to claim 1, further comprising:

a gas cooling step for introducing the cracked gas obtained in the gas cracking step and a gasified gas obtained in the smelting and gasifying step; and a gas cleaning step, for obtaining a cleaned gas, including a washing treatment for washing the gas, a desulfurization treatment for removing the hydrogen sulfide and a residual organic gas removal treatment for absorbing residual organic gas with an activated charcoal filter after the gas cooling step for cooling the cracked gas and the gasified gas.

6. A waste treatment method according to claim 1, further comprising the steps of compressing a cleaned gas obtained from the gas cleaning step and then temporarily storing the cleaned gas, the stored gas being then supplied to a gas utilization equipment such as a gas engine and a boiler.

7. A waste treamtent method according to claim 1, further comprising either one set of the steps of recovering a heat from a combustion gas in the pyrolysis step, heating the air by the recovered combustion gas, and supplying the heated air as the combustion air for the pyrolysis step, and the steps of providing a heat insulating material around a smeltor/gasifier unit in the smelting and gasification step and supplying a heat energy of a hot water generated through a water cooling process to a treating equipment.

8. A waste treatment method according to claim 1, wherein a gas generated through a waste treatment is stored and supplied as a heating source for the pyrolysis unit of a heating source for the smeltor/gasifier unit at the smelting and gasifying step.

9. A waste treatment method according to claim 1, wherein a gas generated through a waste treatment is stored and supplied to a treatment equipment as thermal energy source of electric energy source.

10. A waste treatment apparatus for treating a waste containing organic substance comprising:

a pyrolysis unit for introducing and pyrolysing the waste in a condition sealed from air so as to separate to a pyrolysis gas and a pyrolysis residue;

a gas cracking unit for introducing the pyrolysis gas generated in the pyrolysis unit and reacting an oxide component in the pyrolysis gas through an oxidization reaction so as to pyrolyse high molecular hydrocarbon component in the pyrolysis gas with a heat generated by the oxidization reaction so as to obtain a cracked gas containing low molecular hydrocarbon;

a residue cooling unit for introducing the pyrolysis residue generated in the pyrolysis unit and cooling the residue for solidification thereof;

a mechanical processing unit for crushing and sorting the solidified pyrolysis residue to obtain a pyrolysis char essentially consisting of pyrolysed organic substance and inorganic component;

a smelting and gasification unit for burning the pyrolysis char at a high temperature sorted by the mechanical processing unit by being mixed with fuel and oxygen or air so as to melt the inorganic component of the pyrolysis char and for gasifying the carbon component to obtain gasified gas containing low molecular hydrocarbon;

a gas cooling unit for the cracked gas obtained in the gas cracking unit and the gasified gas obtained in the smelting and gasification unit;

a gas cleaning unit for removing impurity contained in the gas to obtain a cleaned gas;

a gas compressor for compressing the cleaned gas obtained by the gas cleaning unit; and a gas holder for storing the compressed cleaned gas.

11. A waste treatment apparatus according to claim 10, wherein the mechanical processing unit comprises a crusher for crushing pyrolysis residue and a sorter for sorting metal, pyrolysed organic substance and inorganic component.

12. A waste treatment apparatus according to claim 10, further comprising a gasified gas cooling unit for rapidly cooling gasified gas provided at an outlet of the smelting and gasification unit.

13. A waste treatment apparatus according to claim 10, wherein the gas cooling unit is a boiler or other heat exchanger for recovering heat energy possessed by gas and cooling the gas.

14. A waste treatment apparatus according to claim 10, wherein the gas cleaning unit comprises a gas washing means for washing gas, a desulfurization means for removing hydrogen sulfide, and an activated charcoal filter means for absorbing residual organic gas.

15. A waste treatment apparatus according to claim 10, wherein the pyrolysis unit has a double cylindrical structure comprising an inner cylinder to which waste is introduced and an outer cylinder disposed outside the inner cylinder for heating the inner cylinder, said inner cylinder has a length longer than that of the outer cylinder so that both ends of the inner cylinder project over both ends of the outer cylinder, said projecting portion being supported by a roller to be rollable and at least said inner cylinder being inclined at a downward gradient of less than 5° from a waste intake side to an outlet side.

16. A waste treatment apparatus according to claim 15, further comprising a combustion chamber in which a space is defined between the inner cylinder and outer cylinder of the pyrolysis unit, said space being divided into a plurality of sections in an axial direction of the outer cylinder, and said inner cylinder being heated by passing combustion gas through the space sections.

17. A waste treatment apparatus according to claim 15, wherein a press means for compression on a loading side is provided at a waste loading portion of the pyrolysis unit and an end resistant plate for compressing the waste is provided at an outlet of the press means.

18. A waste treatment apparatus according to claim 17, further comprising a scraper for scraping compressed waste provided outside the end resistant plate.

19. A waste treatment apparatus according to claim 15, further comprising a press means, for compression on the discharging side, provided at a pyrolysis residue discharging portion of the pyrolysis unit and an end resistant plate, for compressing the waste, provided at an outlet of the press means.

* * * * *